H. ABRAHAM.
STRIP SHINGLE CUTTER.
APPLICATION FILED MAY 19, 1920.
1,415,758.
Patented May 9, 1922.
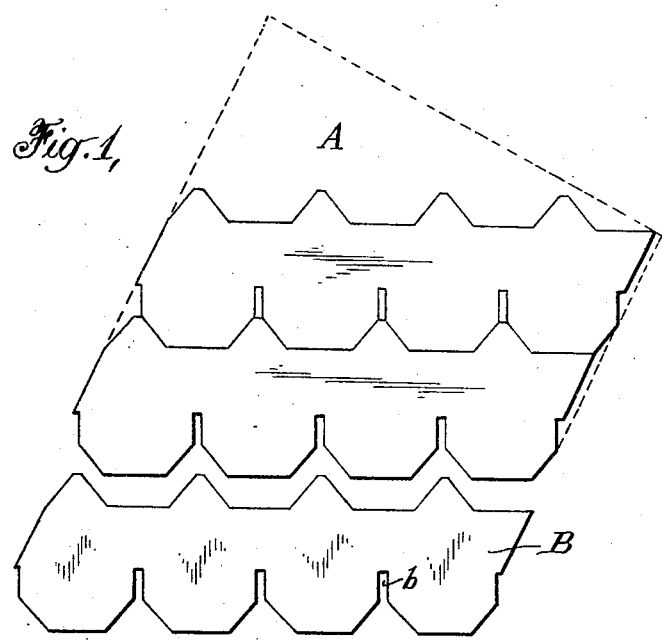
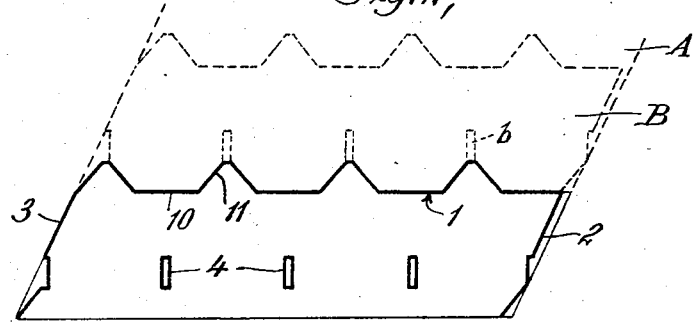
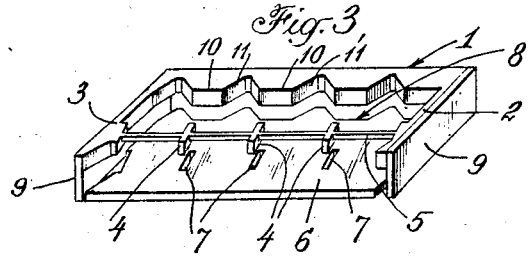
Inventor
Herbert Abraham
By his Attorney

UNITED STATES PATENT OFFICE.

HERBERT ABRAHAM, OF NEW YORK, N. Y., ASSIGNOR TO THE RUBEROID CO., A CORPORATION OF NEW JERSEY.

STRIP-SHINGLE CUTTER.

1,415,758.      Specification of Letters Patent.      Patented May 9, 1922.

Application filed May 19, 1920. Serial No. 382,495.

*To all whom it may concern:*

Be it known that I, HERBERT ABRAHAM, a citizen of the United States, residing at the city, county, and State of New York, have invented certain new and useful Improvements in Strip-Shingle Cutters, of which the following is a specification.

This invention relates to a reciprocating cutter for forming strip shingles of the type shown in my Patent, No. 1,326,899, of January 6th, 1920.

The cutter is designed to cut a web of roofing material diagonally and thereby reduce the waste of material which is produced when the strips are cut straight across the web, as has heretofore been the practise.

In application for Letters Patent, executed by me on the 13th day of May, 1920, I have disclosed and claimed a method of forming roofing elements by cutting a web of fabric diagonally to its lateral edges. In cutting the elements described in that application, none of the material at the sides of the web is wasted, but in cutting strips of the present type, by reason of the shape of said strips, a portion of the marginal edge is wasted, however, as before stated, the wastage produced is considerably less than that which is produced when the strips are cut straight across the web.

In the accompanying drawings, Fig. 1 is a section of a sheet of prepared roofing, showing the manner of cutting the strips therefrom, together with a severed strip;

Fig. 2 is a diagrammatic view showing the operation of the device, the heavy lines indicating the cutting edges of the cutter; and, Fig. 3 is a perspective view of the cutter and the co-operating shear plate.

The cutter to which this invention particularly relates consists of a transverse member 1 and two parallel side members 2 and 3, which extend obliquely to the member 1; the arrangement of the parts being such, with relation to the web A, that the member 1 will extend diagonally across the web and the members 2 and 3 will be parallel to the lateral edges of the web. It is to be understood that means are provided for reciprocating the cutter and for intermittently feeding the web the width of one strip at each movement but as such mechanisms are well known in the art and do not constitute a part of this invention, they are, therefore, not shown or described herein.

The transverse member 1 is provided with straight cutting edges 10 and indented cutting edges 11, corresponding in shape to the upper and lower edges of the strip B. The side members 2 and 3 are provided with cutting edges which correspond with the shape of the sides of the strip. The cutter is also provided with oblong shaped punching dies 4, which serve to punch out the slots $b$ along the lower edge of the strip. Said punching dies are carried to reciprocate with the cutter, and to this end I provide a bar 5, extending across the arms 2 and 3 and on which the punching dies are mounted. It will be understood that the dies 4 may be mounted in any suitable manner so as to reciprocate with the cutter.

To co-operate with the reciprocating cutter in severing the strips, I provide a stationary shear plate 6, which is located underneath the cutter and over which the web travels. Said plate has its rear edge 8 shaped to correspond to the cutting edge of the member 1 and its sides shaped to correspond to the cutting edges of the members 2 and 3, respectively, as seen in Fig. 3 of the drawing. The cutter is provided with a pair of guide members 9 which serve to guide the cutter in its vertical movement relative to the shear plate.

The shear plate is provided with oblong shaped openings 7, which register with the punching dies 4 and co-operate therewith in punching out the slots $b$ of the strip. The punchings and material trimmed from the sides of the web are caught separately and prevented from mingling with the cut strips.

By referring to Fig. 2, it will be seen that each operation of the reciprocating cutter partially forms the outline of one strip at an end of the web and forms a series of openings $b$ in the body thereof, and also severs the preceding partially formed strip thereby providing successive completed strips B of desired configuration. It is to be understood that between successive operations of the reciprocating cutter, the web is fed forwardly an extent equal to the width of the completed strip B. The relation of the punches 4 and the indented cutting edges 11 is such that the openings $b$ formed at one operation of the cutter will merge into the recesses formed in the rear end of the completed strip at the succeeding operation of the cutter.

For economy of manufacture a web of sufficient width may be taken and cut to produce any desired number of strips.

Having described my invention, what I claim is:

1. A device for cutting shingle strips from a web of prepared roofing comprising a reciprocating cutter having a transverse member extending diagonally of the web and two side members extending parallel to the edges of the web, and a shear plate co-operating with the cutter in severing strips from the webs.

2. A device for cutting shingle strips from a web of prepared roofing comprising a reciprocating cutter having a transverse member extending diagonally of the web and two side members extending parallel to the edges of the web, punching dies carried by the cutter and disposed between the side members, and a shear plate having openings registering with the punching dies and co-operating with the cutter in severing the strips from the web.

3. In a machine for cutting shingle strips each having a plurality of shingle-like portions on one edge separated by recesses merging into slots and having tabs on the opposite edge disposed over the middles of the shingle-like portions, the combination of a reciprocating die-cutter and a co-operating shear plate, arranged to cut a web of material diagonally, and at each operation to form an edge of one strip and simultaneously to form the slots of the succeeding strip.

HERBERT ABRAHAM.